United States Patent [19]

Anquetil et al.

[11] Patent Number: 5,350,718
[45] Date of Patent: Sep. 27, 1994

[54] GLASS FRITS, A PROCESS FOR THEIR PRODUCTION AND THEIR USE IN ENAMEL BARRIER LAYERS FOR STOPPING THE MIGRATION OF SILVER

[75] Inventors: Jerome Anquetil, Saint-Leonard-de-Noblat; Alain Dauger, Boisseuil, both of France

[73] Assignee: Degussa Aktiengesellschaft, Frankfurt, Fed. Rep. of Germany

[21] Appl. No.: 115,034

[22] Filed: Sep. 1, 1993

Related U.S. Application Data

[63] Continuation-in-part of Ser. No. 857,369, Mar. 24, 1992, abandoned.

[30] Foreign Application Priority Data

Mar. 25, 1991 [FR] France .................. 91 03571

[51] Int. Cl.$^5$ .................... C03C 8/04
[52] U.S. Cl. .................. 501/21; 501/26; 501/79; 428/434
[58] Field of Search .......... 501/21, 26, 77, 79; 428/434

[56] References Cited

U.S. PATENT DOCUMENTS

| | | | |
|---|---|---|---|
| 4,493,900 | 1/1985 | Nishino et al. | 501/26 |
| 4,837,383 | 6/1989 | Adrews | 427/108 |
| 4,892,847 | 1/1990 | Reinherz | 501/77 X |
| 5,001,087 | 3/1991 | Kubota et al. | 501/79 X |
| 5,141,798 | 8/1992 | Chaumonot et al. | 501/22 X |

FOREIGN PATENT DOCUMENTS

| | | |
|---|---|---|
| 0246012 | 3/1966 | Austria . |
| 0377062 | 7/1990 | European Pat. Off. . |
| 0504682 | 3/1992 | European Pat. Off. . |
| 755929 | 10/1944 | Fed. Rep. of Germany . |
| 883693 | 6/1953 | Fed. Rep. of Germany . |

OTHER PUBLICATIONS

Chemical Abstracts, vol. 83, No. 8, p. 195, Abstract No. 61788y (1975).
Chemical Abstracts, vol. 82, No. 2, p. 182, Abstract No. 7123u (1973).
Chemical Abstracts, vol. 70, No. 22, p. 203, Abstract No. 99283z (1968).
Chemical Abstracts, vol. 88, No. 12, p. 246, Abstract No. 77991y (1977).
Chemical Abstracts, vol. 90, No. 14, p. 309, Abstract No. 11329y (1977).

*Primary Examiner*—Karl Group
*Attorney, Agent, or Firm*—Beveridge, DeGrandi, Weilacher & Young

[57] ABSTRACT

Glass frits are disclosed which are essentially free of lead and contain 0.05 to 15 mol-% sulfur and/or sulfides, preferably zinc sulfide. A process is disclosed for producing a glass frit by melting a mixture of oxides and/or non-oxide compounds (fluorides, carbonates) at temperatures of 1,000° to 1,300° C., followed by sudden cooling, characterized in that the glass frit contains between 0.05 and 15 mol-% sulfur, zinc sulfide or other sulfides. The glass frits can be used in enamel barrier layers for stopping the migration of silver.

17 Claims, 6 Drawing Sheets

GLASS FRITS, A PROCESS FOR THEIR PRODUCTION AND THEIR USE IN ENAMEL BARRIER LAYERS FOR STOPPING THE MIGRATION OF SILVER

REFERENCE TO A RELATED APPLICATION

This is a continuation-in-part of our copending U.S. patent application Ser. No. 07/857,369 filed Mar. 24, 1992, now abandoned, which is relied on and incorporated herein by reference.

BACKGROUND AND INTRODUCTION

The present invention relates to the glass frits which, screen-printed on their own, in an overlayer or in an enamel, are capable of stopping the heat-activated migration of $Ag^+$ ions between a support of float glass and a silver-based resistive layer.

Enamel compositions for glass are well known in the art. They are generally formed after firing by a vitreous phase supplied by the frit(s) used and a coloring and opacifying crystalline pigment phase to which other compounds may be added to obtain various effects. They are suitable for various applications and may be used inter alia for forming borders at the periphery of sheets of flat float glass which are thermoformed and then tempered for use as glazing in motor vehicles.

Originally used with the sole object of protecting the adhesive used to fix the sheets of glass (windshields, rear windows, side windows) to bodywork against the ultraviolet radiation in sunlight, these strips of black or gray enamels were subsequently the subject of aesthetic research. Attempts have been made in particular to use these enamels to conceal the lateral silver conducting tracks of heated rear windows and the welding spots of the connecting terminals of the current supply wires. It has now been found that after the heat treatment required for curving and tempering, none of the enamels of conventional compositions are capable of completely concealing the silver conducting tracks applied in superposed form and heated with the enamel or the above-mentioned weld spots.

Various studies have demonstrated the existence of heat-activated transport of the $Ag^+$ cations from the resistive layer through the enamel to the enamel/glass interface, thus revealing the presence of conducting tracks behind the enamel by an intense colorimetric contrast.

It is known from U.S. Pat. No. 4,837,383 that it is desirable to prevent the migration of silver when using an enamel consisting of a glass flux based on a glass frit, pigments, elemental aluminum and/or lithium oxide and a vehicle for paste formation. European patent application EP-A 0 377 062 claims improvements in the silver-based opacity of enamels by the addition before paste formation of silicon, boron, carbon, lead and/or silver in their elemental forms.

It is known from U.S. Pat. No. 5,141,798 that heavy metal sulfides can be used in an enamel for coating onto glass panes with silver conducting layers. The enamel contains glass frit and pigments in the form of heavy metal oxides or heavy metal sulfides. However, the sulfides are not part of the glass frit.

Additions of the type mentioned have not proved entirely satisfactory for obvious reasons of cost (silver), special operating conditions necessitated by the introduction of highly reducing elements, such as silicon or boron, stability to acids (lithium) or toxicity (lead). The enamels developed with additions such as these in conjunction with the present state-of-the-art in this field show that, despite the aesthetic interest there is in completely concealing the silver conducting tracks by enamel, such solutions limit the range of colors currently useable by the automotive industry to a few blacks and to a few grays.

In addition, the quality of the masking effect obtained is largely influenced by the firing cycle as a whole.

SUMMARY OF THE INVENTION

One object of the present invention is to provide an enamel barrier layer for stopping the migration of silver cations from the conducting tracks to the glass during the firing of a combination of flat glass with an enamel barrier layer and, above this enamel layer, a resistive layer of silver which would not have the disadvantages of the systems mentioned above.

In achieving the above and other objects, one feature of the present invention resides in eliminating the need to form a paste of the additives mentioned above, whereby the present invention offers a general solution to the problems discussed above.

Another feature of the present invention resides in providing glass frits containing 0.05 to 15 mol-% sulfur and/or sulfides, where the sulfides are at least partially dissociated and sulfur is a component of the glass structure.

It is still a further feature of the present invention that the glass frits of this invention are essentially free of lead oxide.

In another embodiment of the invention, the frits contain zinc oxide in a quantity of 15 to 70% by weight and preferably in a quantity of 30 to 65% by weight.

In a further embodiment of the invention, the frits contain silicon dioxide in a quantity of 15 to 40% by weight and boron trioxide in a quantity of 5 to 25% by weight.

In still another embodiment of the invention, the frits contain coloring metal oxides.

In another embodiment, the invention relates to a glass frit obtained by fusion of a mixture of oxides and/or non-oxide compounds (fluorides, carbonates) at temperatures of 1,000° to 1,300° C., followed by sudden cooling, characterized in that it contains from 0.05 to 15 mol-% sulfur, zinc sulfide or other sulfides.

In yet another embodiment, the invention relates to the use of the glass frits to form enamel barrier layers for stopping the migration of silver from a resistive silver layer to the glass during the firing of a combination of sheet glass with one or more enamel layers, including the enamel barrier layers, and—above this layer—a resistive silver layer.

BRIEF DESCRIPTION OF THE DRAWINGS

The invention will be further understood with reference to the accompanying drawings, wherein.

DETAILED DESCRIPTION OF THE INVENTION

Figure 1:
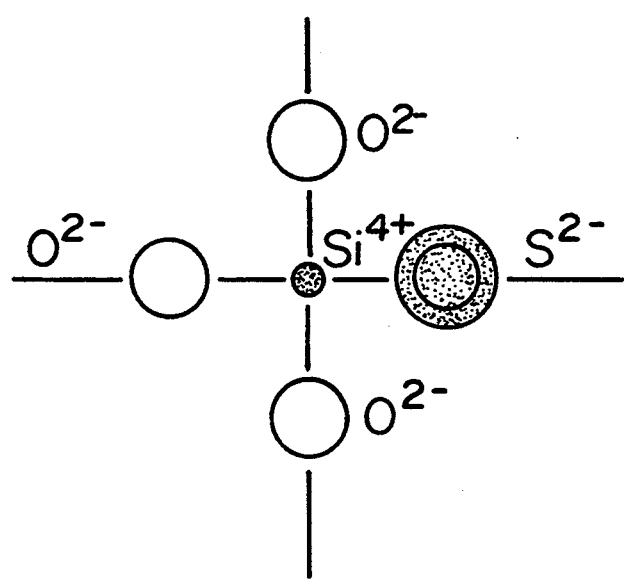
FIG. 1-shows a representation of the three-dimensional tetrahedral arrangement in the amorphous structure of the glass frit of the present invention.

It has been found that the addition of 0.05 to 15 mol % sulfur or sulfides (preferably zinc sulfide) to a mixture of typical glass making oxides and/or non-oxide compounds for the production of a glass frit provides the frit with the property of stopping the heat-activated diffusion within the frit of the $Ag^+$ cations from the conductors of the resistive network based on silver.

In addition to sulfur and/or sulfides, the frits consist of a suitable association of oxides in a vitrifiable composition. It is known in this art that there are many different associations of oxides which, after fusion, give glass frits, see for example U.S. Pat. No. 4,892,847 (which is incorporated by reference in its entirety), EP-A-0 377 062 and EP-A-0 294 502.

As is known in the art, the choice of the oxides determines the properties of the glass frits, for example their softening point, their thermal expansion coefficient and their stability to bases and acids. In general, the colorless glass frits contain oxides selected from:

| $SiO_2$, | $Al_2O_3$, | TiO, | ZnO, | MgO, | $Li_2O$, |
|---|---|---|---|---|---|
| $B_2O_3$, | $Bi_2O_3$, | $SnO_2$, | $MoO_3$, | CaO, | $Na_2O$, |
| $La_2O_3$, | $ZrO_2$, | MnO, | BaO, | $K_2O$, | $V_2O_5$, | although other oxides, for example $P_2O_5$, $Cr_2O_3$, $Fe_2O_3$, CuO, NiO, CoO, $WO_3$, $CeO_2$, etc., may also be present. According to the present invention, frits based on borosilicates, particularly zinc borosilicates, are preferred. These are well known glass forming compositions. It is for this reason that they contain silicon dioxide in a quantity of 15 to 40% by weight, boron trioxide in a quantity of 5 to 25% by weight, and preferably 15 to 70% by weight and, above all, 30 to 65% by weight zinc oxide. Thus, in a typical glass forming composition suitable for purposes of the present invention, there will be a sufficient amount of silicon, expressed as $SiO_2$, and at least one other of the above-mentioned oxides present in the glass frit; however, the glass frit is essentially free of lead oxide (i.e., no lead containing components are intentionally added to the composition).

The introduction of sulfur during dry-mixing of the composition before melting may be carried out either in the form of flowers of sulfur or in the form of sulfides, although dissolution and retention in the structure of the glass vary according to the method of introduction selected. The advantage of ZnS over elemental sulfur and the other sulfides is that it remains stable up to the fusion of the eutectics of the oxides of the mixture, and it is only within this molten mixture that ZnS is progressively dissolved. Accordingly, the elimination of $SO_2$ and the loss of elemental sulfur are avoided with ZnS. In addition, it has been found that zinc is an element which promotes stabilization of the sulfur in the vitreous atomic structure.

In principle, sulfides other than ZnS, for example sulfides of alkali metals, alkaline earth metals or of Mn, Fe, Co, Ni, Cu, Cd, Sn, Sb, Bi, may be introduced into the mixture to be melted. However, it should be pointed out that some of these sulfides, such as for example MnS, FeS, $Cu_2S$, CdS color the vitreous mass. PbS should not be used since it is not dissociated and the frits should be basically free of lead. In addition, the introduction of these sulfides in large quantities can cause liquid-phase separation within the molten mass. It is pointed out that the presence of elemental sulfur in the frits according to the invention is necessary for the interaction with the $Ag^+$ cations and that, introduced in the form of sulfides, these sulfides are at least partly dissociated (ZnS begins to associate at around 900° C.) during melting of the fusible mixture so that, thereafter, it is only the sulfur which reacts with the $Ag^+$ cations in an enamel barrier layer containing the vitreous structure of such frits.

As shown in FIG. 1, sulfur partially replaces oxygen in the three-dimensional tetrahedral arrangement in the amorphous structure of the glass frit of the present invention. The $Ag^+$ diffusion through the enamel layer into the amorphous phase (the frit) is stopped because of the following reaction which converts the silver ions to elementary silver:

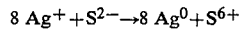

$$8\ Ag^+ + S^{2-} \rightarrow 8\ Ag^0 + S^{6+}$$

Figure 2A:
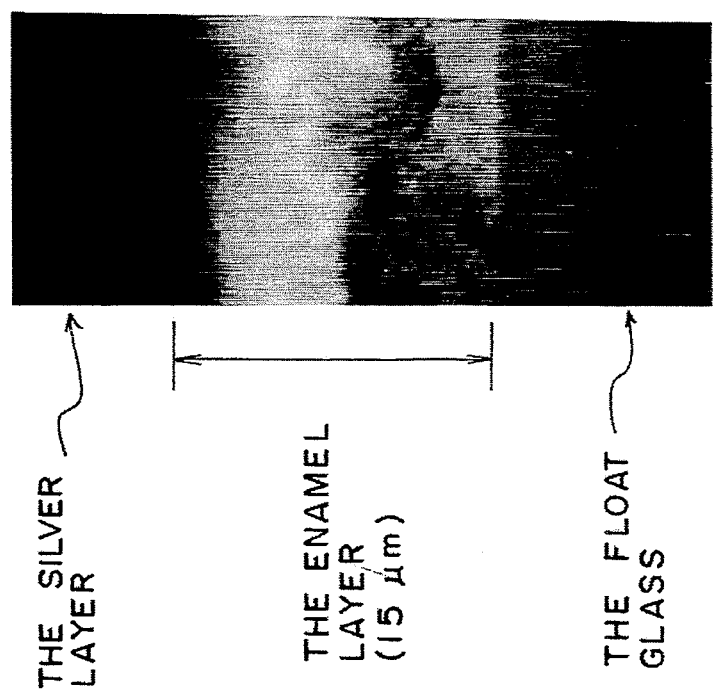
FIG. 2A is a photomicrograph of a section through the sequence of layers of the present invention: float glass, enamel layer, silver layer.
Figure 2B:
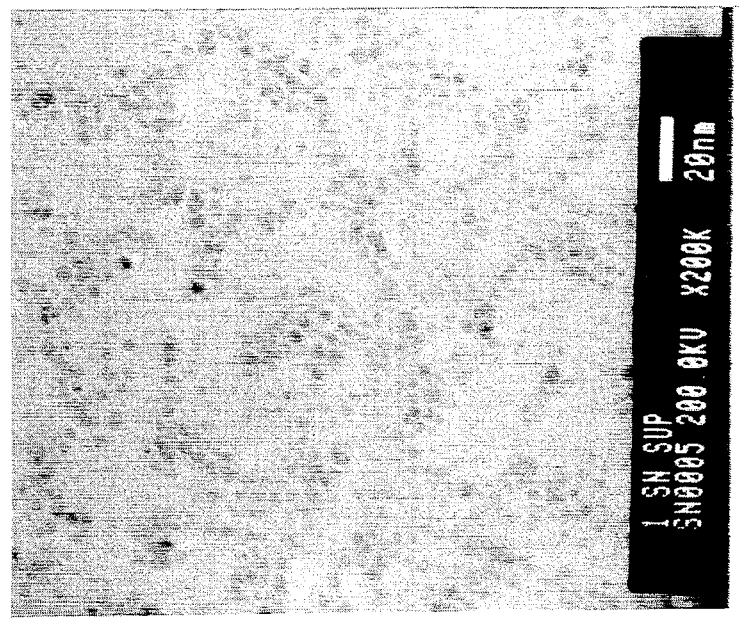
FIG. 2B is a REM photograph of the enamel layer showing formed particles of elementary silver (after firing).

The product of this reaction is a multiplicity of small silver spherical particles dispersed throughout (see FIG. 2B). These particles produce absorption and scattering of light and a yellow color that can be seen under the silver layer; this is represented by the photomicrograph of FIG. 2A.

Figure 3:
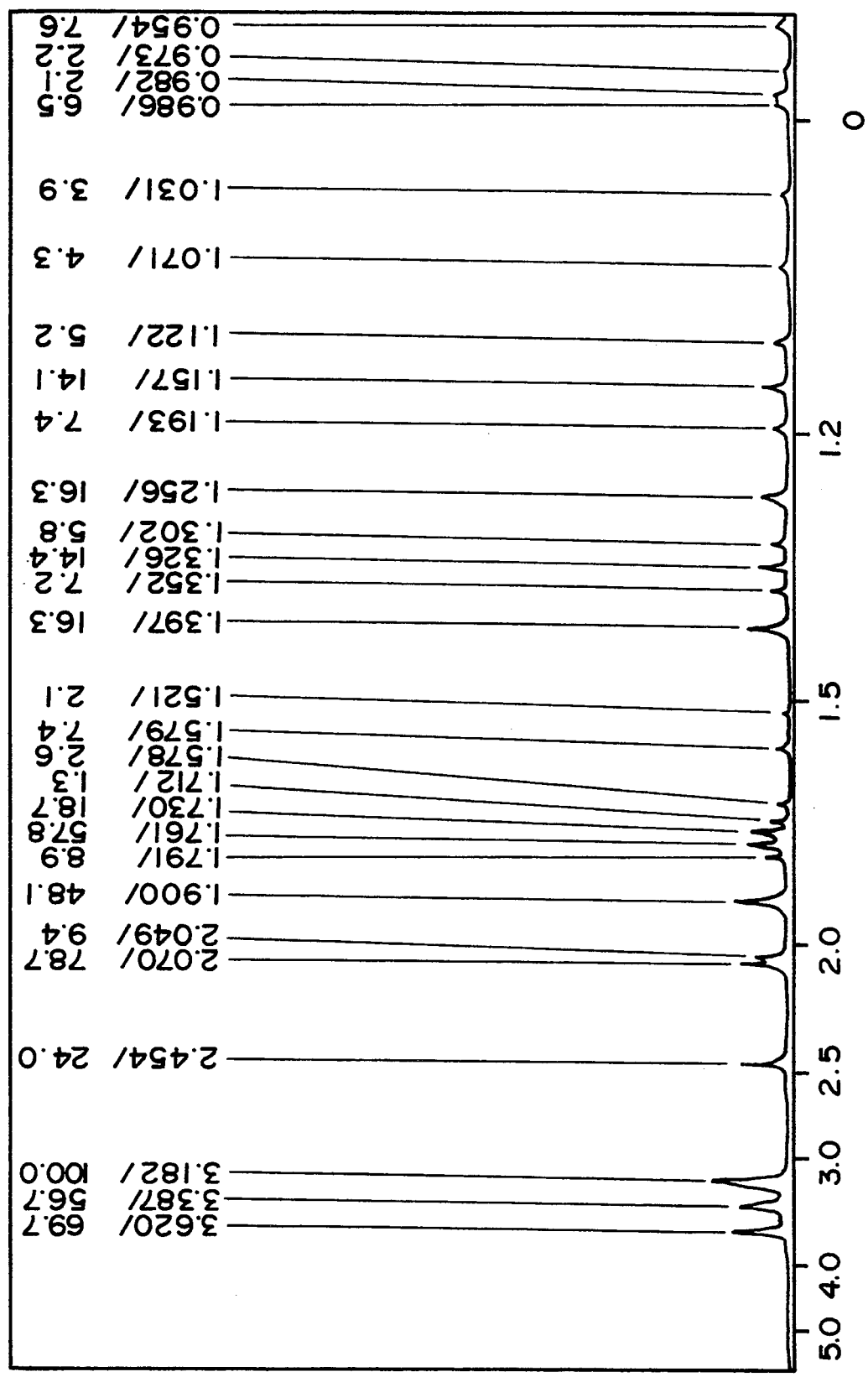
FIG. 3 is an RX diffraction pattern of cadmium sulfide.

For the purpose of demonstrating the difference in the characteristics of the glass frits of the present invention compared to other glasses, a number of RX diffraction patterns were obtained using conventional techniques. Thus, FIG. 3 shows the RX diffraction pattern of cadmium sulfide with characteristic peaks between 3 and 4, at 2.5 and the like.

Figure 4:
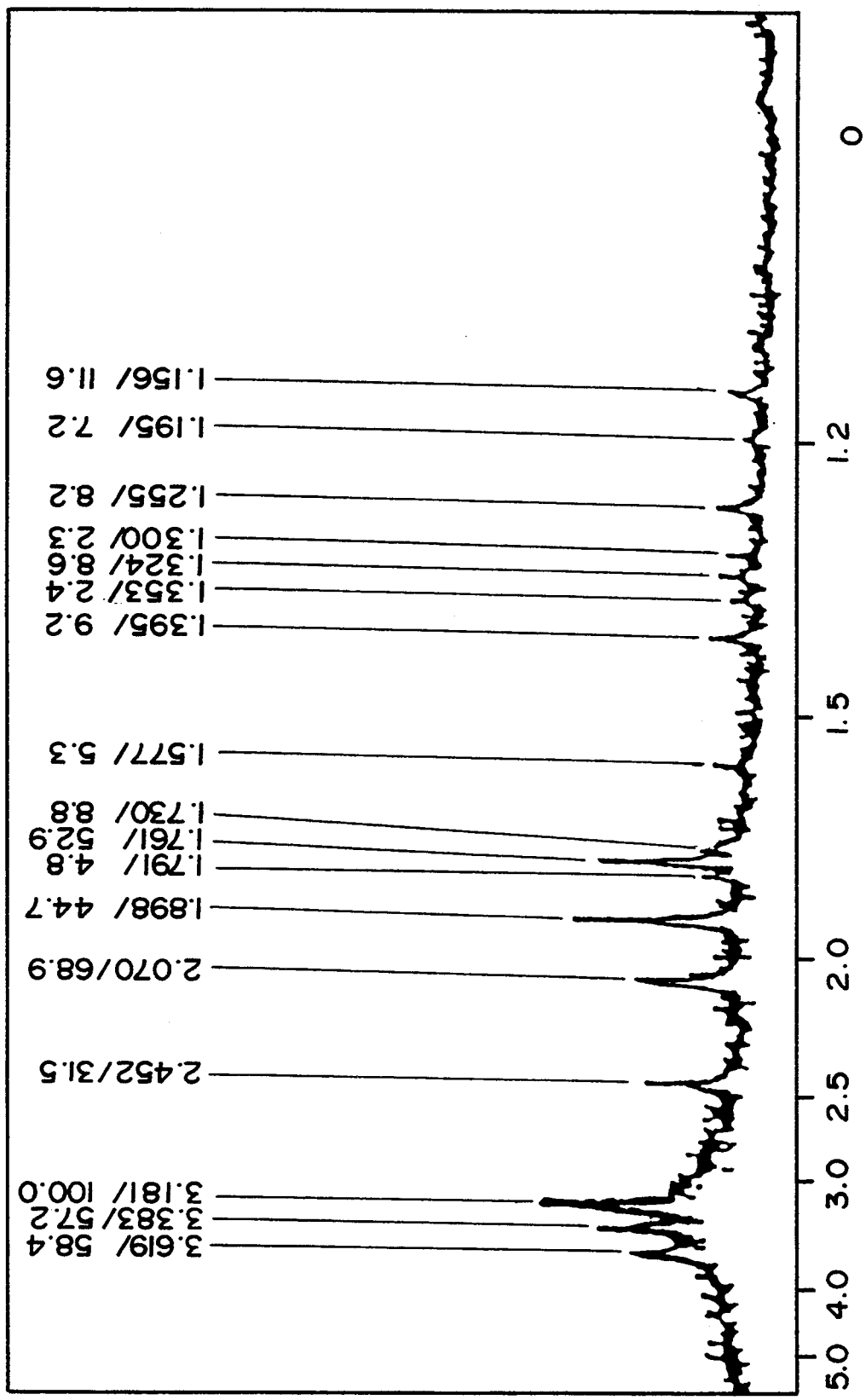
FIG. 4 is an RX diffraction pattern of a ZnO-free glass containing cadmium sulfide.

FIG. 4 shows an RX diffraction pattern of a glass frit containing CdS but no ZnO. CdS signals can be clearly identified in the glass frit (i.e., the peaks at 3 to 4 and 2.5 clearly show that CdS is basically present in crystalline form in the glass frit).

Figure 5:
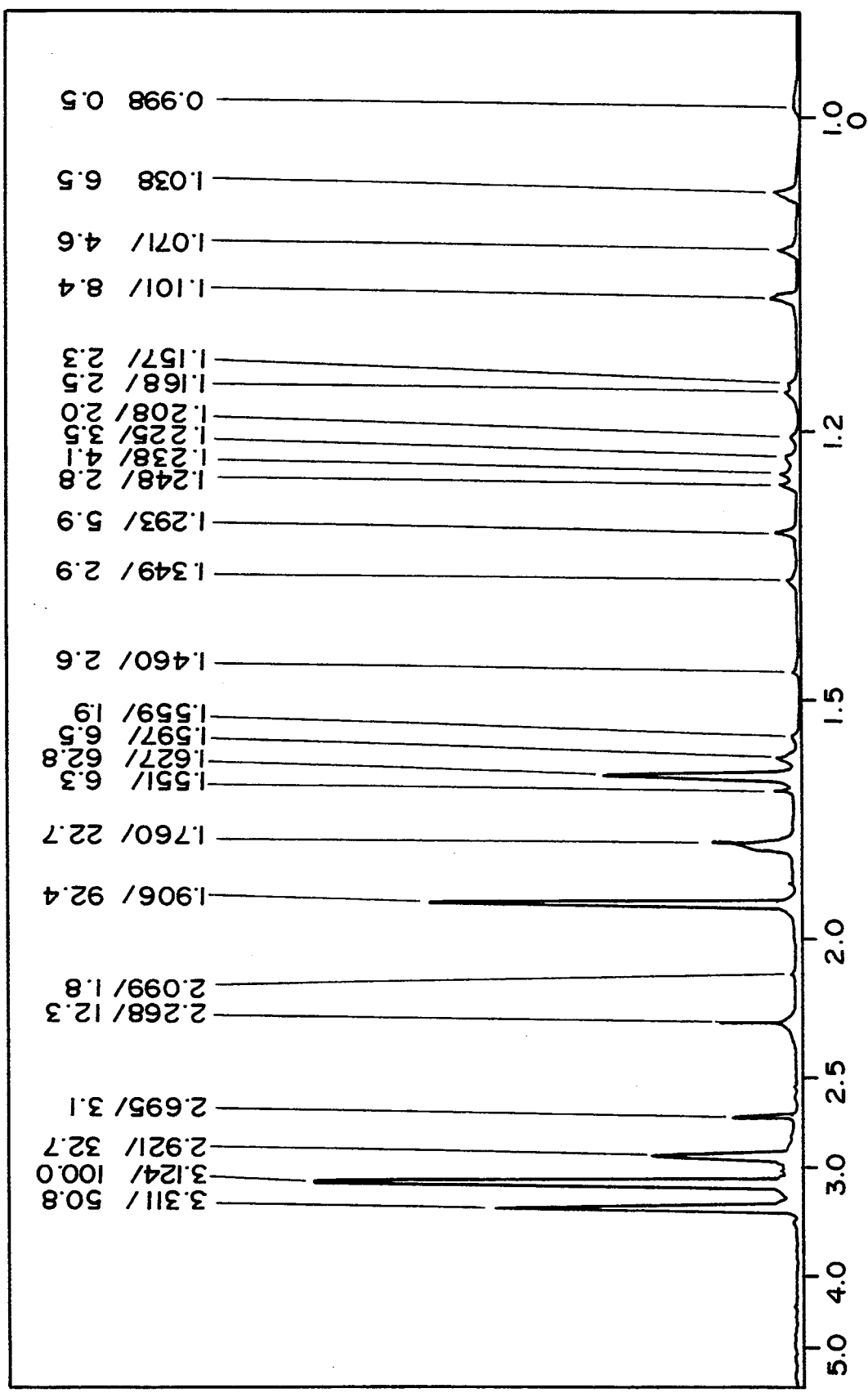
FIG. 5 is an RX diffraction pattern of ZnS.
Figure 6:
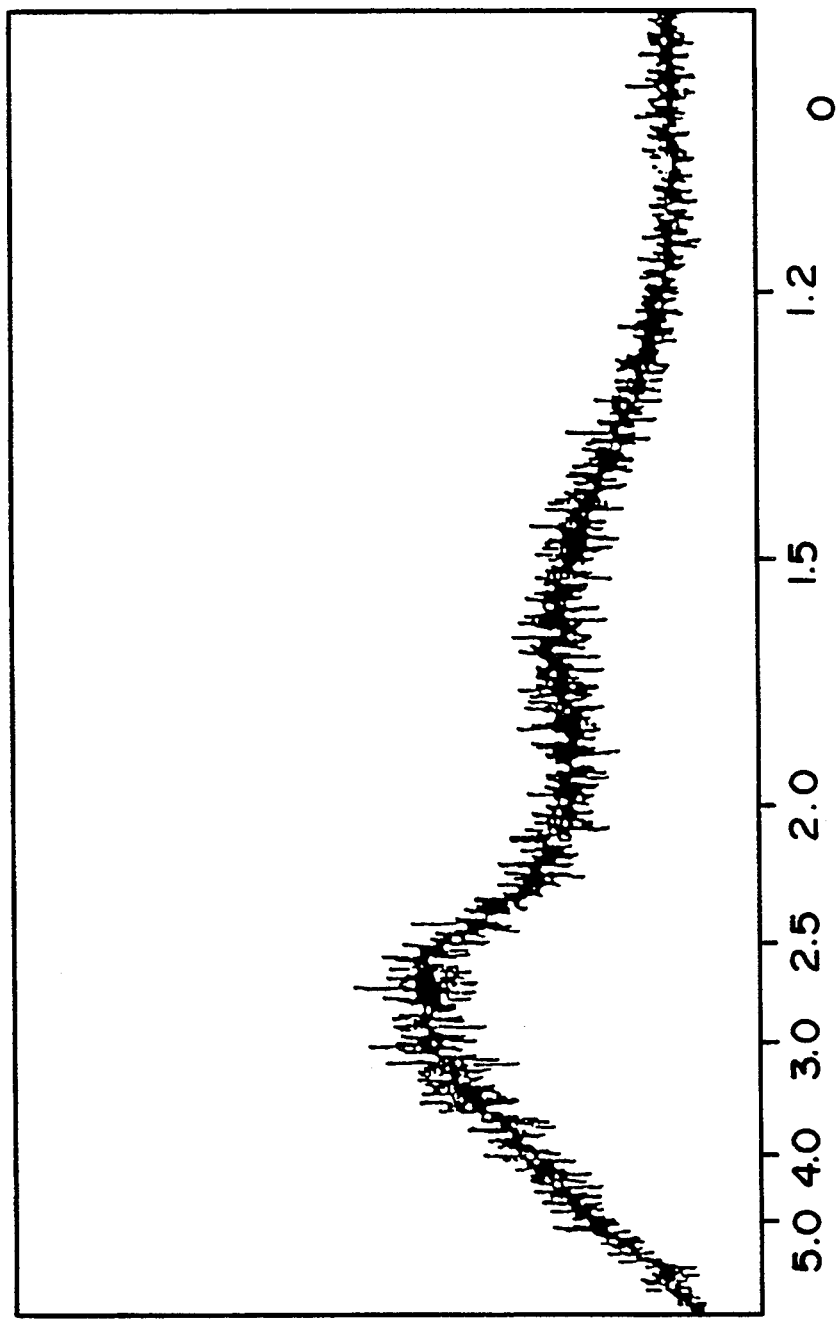
FIG. 6 is an RX diffraction pattern of a glass frit containing zinc sulfide and zinc oxide.

FIG. 5 is a plot of the RX diffraction pattern of ZnS with characteristic sharp peaks at certain specific locations. In contrast, FIG. 6 shows the RX diffraction pattern of a glass frit containing ZnS and ZnO according to the present invention. The glass frit no longer exhibits the sharp peaks for the ZnS signals. This shows that the sulfide has been incorporated into the amorphous glass structure.

The general methods for producing glass frits are known to the person skilled in the art. To make the glass frits according to the invention, a mixture consisting of (a) the glass forming oxides and/or compounds which form oxides by melting into a vitrifiable composition corresponding to the composition of the frit and (b) one or more compounds selected from sulfur, zinc sulfide and other sulfides in a quantity of 0.05 to 15 mol-% of the mixture, is melted at temperatures of 1,000° to 1,300° C., after which the molten glass is suddenly cooled in water. This quenching step is well known in the art.

Subsequent grinding of the granules obtained provides the ready-to-use frit powder.

The mixture mentioned above is preferably composed of oxides, although alkali metal and alkaline earth metal oxides are often introduced in the form of carbonates. Melting is carried out conventionally in a refractory ceramic crucible or in a furnace having a suitable lining. The fragments of the glass obtained as a result of the rapid quenching are ground (preferably 90% smaller than $20 \cdot 10^{-6}$ m) to thereby form the frit by known grinding techniques for glass frits.

By virtue of their ability to stop the migration of silver, the glass frits according to the invention may be used to form enamel barrier layers. These enamels may be colorless or colored, transparent or opaque. The enamel barrier layers may contain other frits as the vitrifiable compound although the essential constituent is always a frit containing sulfur. The enamel barrier layers according to the invention stop the migration of silver during firing of the combinations of sheet glass with one or more enamel layers, including the barrier layers, and—above the last enamel layer—a resistive silver layer. The function which the vitreous structures of the enamel barrier layer performs in stopping the migration of silver is also effective at the temperatures required for curving and tempering the sheets of glass to form objects such as the windshields of automobiles. The enamel barrier layer may be situated between the glass, for example a sheet of flat glass, and a resistive network based on silver and conceals the silver conductors if the enamel is colored and preferably opaque. The barrier layer may be situated between an opaque colored enamel applied to the glass and a resistive silver layer.

The enamel of the unfired barrier layer is formed by one or more frits according to the invention, colorants and/or opacifiers where a decorative effect is required and a vehicle for paste formation, for example a screen-printing oil based on solvents, natural resins and/or thermoplastics. The vehicle for paste formation is selected according to the final application envisaged. It must provide for effective suspension of the particles and must be completely consumed during firing and tempering. As will be apparent to those skilled in the art, the enamel of the barrier layer and/or a subjacent enamel of conventional composition have to meet certain requirements and, in the case of decorative enamels, must have above all a sufficient pigment content to satisfy the color and opacity requirements.

The enamels of the barrier layers according to the invention are applied by known screen printing techniques either directly or by way of a transfer or another intermediate support. The average thickness per layer after firing is between $5 \cdot 10^{-6}$ m and $50 \cdot 10^{-6}$ m.

In cases where a colorless or colored barrier layer is interposed in the mass between a crude and dry enamel which itself is applied by screen printing and the resistive silver layer, disorientation of the meshes of the screen printing cloths used for one or other of the applications will be favorable. In this way, firing of the combination of glass (with all the enamel layers) and the resistive silver layer (for example 60 to 80% by weight silver) is carried out in a single operation.

The heat treatment, i.e., firing followed by tempering, of the combinations of glass/enamel barrier layer/resistive silver layer or glass/conventional enamel layer/enamel barrier layer/resistive silver layer is carried out in various types of furnaces, according to the intended application of the enamelled glass. The firing temperature is also determined by the composition of the frit(s) used in the enamels. In general, the firing temperature varies from 450° C. to 800° C. and preferably from 550° C. to 750° C.

In tests (see Example 10) it was found that, in the enamels described in DE-OS 38 32 937 (U.S. Pat. No. 4,828,596) and DE-OS 38 38 196 (U.S. Pat. No. 4,822,396) which are formed by a conventional frit, a vehicle and, in addition, a sulfide of copper, zinc, iron, tin or aluminum, there was no favorable action in stopping the $Ag^+$ cations, i.e. there was no effective interaction between sulfide and $Ag^+$.

The $S—Ag^+$ interaction and the resulting arrest of the $Ag^+$ cations is thus a quality unique to enamels of which the frits contain elemental sulfur and/or a sulfide dissolved in the vitreous mass. Frits which do not contain dissolved sulfur and which are applied on their own or in association with pigments do not provide the layer formed—all other things being equal—with the property of stopping the $Ag^+$ cations during their heat-activated migration towards the interface with the glass. In addition, the direct introduction of sulfides into the enamel, as in the documents cited above, i.e. as an associated pigment charge, causes a significant colorimetric drift whereas the use of a frit according to the invention (containing sulfur) causes no such drift.

The invention will be further understood with reference to the following Examples in conjunction with the accompanying figures.

EXAMPLES 1 to 4

Frits having the following compositions were prepared for colorless barrier layers:

| Composition of the frit | 1 | 2 | 3 | 4 |
|---|---|---|---|---|
| | | mol-% | | |
| ZnS | 1.98 | 3.99 | 4.82 | 5.00 |
| $SiO_2$ | 21.86 | 34.99 | 19.76 | 29.00 |
| $B_2O_3$ | 12.64 | 20.08 | 11.42 | 18.00 |
| ZnO | 63.52 | 30.09 | 64.00 | 34.45 |
| $Na_2O$ | | 6.30 | | 6.00 |
| BaO | | 4.55 | | 4.65 |
| $ZrO_2$ | | | | 1.90 |

The frits were obtained by dry mixing of the oxides except for $Na_2O$ and BaO, which were added as $Na_2CO_3$ and $BaCO_3$, melting at 1,150° to 1,200° C., quenching in water, grinding, and stoving. To obtain the enamel barrier layer, the frits are made into a paste with a conventional vehicle and the enamel is applied by known screen printing techniques.

FIG. 6 shows the X ray diffraction spectrum obtained with the frit of Example 3.

EXAMPLES 5 and 6

Introduction of the sulfur in the form of flowers of sulfur or cadmium sulfide.

| Composition of the mixture for melting | 5 | 6 |
|---|---|---|
| | mol-% | |
| S | 15.00 | — |
| CdS | — | 6.04 |
| $SiO_2$ | 18.95 | 20.95 |
| $B_2O_3$ | 10.97 | 12.11 |
| ZnO | 55.08 | 60.89 |

The frits are produced in the same manner as in Examples 1 to 4.

EXAMPLE 7

The frit may be pigmented as such without affecting its barrier properties. In Example 7, the dissolution of a black colored inorganic pigment of the copper chromite spinel type enables a brown frit to be obtained with its barrier properties intact.

The frit of Example 2 (85.36% by weight) was dry mixed with a black spinel pigment (14.64% by weight), melted, quenched, ground and stoved to obtain an intermediate frit.

The brown frit consists of 70% by weight of the frit of Example 1 and 30% by weight of the intermediate frit mentioned above. To obtain the enamel for a barrier layer, the two frits are disintegrated in alcohol to form a homogeneous mixture, stoved, and paste formed.

EXAMPLES 8 and 9

Black and gray opaque enamels masking the silver collectors.

| Composition of the enamel | 8 | 9 |
|---|---|---|
|  | by weight | |
| Frit of Example 4 | 75 | 77.5 |
| Black pigment, copper chromite spinel type | 25 | 12.5 |
| Titanium dioxide |  | 10.0 |
| Color of the enamel | Black | Gray |

The compounds were disintegrated in alcohol, stoved and paste formed for application as a barrier layer.

EXAMPLE 10

(For comparison with DE-OS 38 32 937 and DE-OS 38 38 196)

Tests for introduction of sulfides into the enamel (composition in parts by weight):

|  | a | b | c | d | e | f |
|---|---|---|---|---|---|---|
| Vitreous enamel powder VA 641 (DPC LIMOGES) | 7.2 | 7.2 | 7.2 | 7.2 | 7.2 | 7.2 |
| ZnS (ALDRICH) | 1.6 |  |  |  |  |  |
| ZnS (PROLABO) |  | 1.6 |  |  |  |  |
| Cu$_2$S |  |  | 1.6 |  |  |  |
| FeS |  |  |  | 1.6 |  |  |
| CdS |  |  |  |  | 1.6 |  |
| MnS |  |  |  |  |  | 1.6 |
| VEHICLE MX 54 (DPC LIMOGES) | 2.8 | 2.8 | 2.8 | 2.8 | 2.8 | 2.8 |
| COLOR OF ENAMEL | BLUISH GRAY | BLUISH GRAY | DEEP GRAY-RED | BROWN-ISH GRAY | GREEN GRAY | GREEN GRAY |
| COLORIMETRIC DIFFERENCES $\Delta$ E IN RELATION TO THE ENAMEL VA 641 AS REFERENCE | 13.40 | 10.11 | 6.15 | 14.80 | 5.30 | 11.40 |

Application of the enamels to glass (4 mm); superposition of the enamelled glass with the silver paste SP 1230 (Degussa AG); vertical firing and tempering for 3.5 minutes at 680° C. were identically carried out by conventional techniques. None of the enamels of Example 10 is effective in stopping the migration of the silver.

EXAMPLE 11

Composition of lead containing frit conventionally used as base for an enamel (according to U.S. Pat. No. 5,141,798 which is incorporated by reference in its entirety):

|  | weight % | grams |
|---|---|---|
| F | 0.19 | 0.8 |
| Na$_2$O | 4.36 | 3.8 |
| PbO | 55.05 | 54.7 |
| B$_2$O$_3$ | 3.34 | 4.7 |
| SiO$_2$ | 30.90 | 30.0 |
| TiO$_2$ | 3.07 | 3.0 |
| ZrO$_2$ | 3.09 | 3.0 |
| + 15.0 grams ZnS | | |

The associate use of ZnS in a glass frit containing lead results in a gray-black frit because it contains PbS particles. Its use in an enamel barrier layer is not possible since it is not able to stop the silver migration because sulfur ions do not replace oxygen in the three-dimensional tetrahedral arrangement in the amorphous structure of the glass frit. All the remaining sulfur ions are combined with lead according to the equation:

$$S^{2-} + Pb^{2+} \rightarrow PbS$$

PbS, along with CdS, is one of the least soluble sulfides (Nouveau traite de chimie minerale, P. Pascal, Masson & Cie editors, volume V, page 374). In U.S. Pat. No. 5,141,798, the sulfides are not dissociated.

Composition of lead free glass frit according to the present invention:

|  | weight % |
|---|---|
| SiO$_2$ | 38.08 |
| ZnO | 18.85 |
| B$_2$O$_3$ | 11.02 |
| Na$_2$O | 11.68 |
| TiO$_2$ | 2.53 |
| + 17.84 weight % ZnS | |

The resulting glass frit is clear. After grinding, its use in an enamel barrier layer stops silver migration.

If 26.42 weight % CdS are used instead of ZnS, the resulting glass frit is also clear. The enamel barrier layer formed therefrom is also good to prevent silver migration.

Further variations and modifications of the invention will become apparent to those skilled in the art from the foregoing and are intended to be encompassed by the claims appended hereto.

French Priority Application No. 91 03571, filed Mar. 25, 1991, is relied on and incorporated herein by reference.

What is claimed:

1. A glass frit essentially free of lead for forming an enamel capable of preventing Ag+ migration, said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulfur and sulfides.

2. The glass frit according to claim 1, wherein said sulfide is zinc sulfide.

3. The glass frit according to claim 1, wherein 30 to 65% by weight of said zinc oxide is present.

4. The glass frit according to claim 1, further comprising coloring metal oxides.

5. The glass frit according to claim 1 which is colorless.

6. The glass frit according to claim 1, wherein said sulfide is at least one member of the group consisting of sulfides of alkali metals, alkaline earth metals, Mn, Fe, Co, Ni, Cu, Cd, Sn, Sb, and Bi.

7. A glass surface having deposited thereon an enamel barrier layer which stops the migration of silver, said layer being formed from a glass frit and optionally one or more colorants and/or opacifiers, said glass frit is essentially free of lead for forming an enamel capable of preventing Ag+ migration, said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulfur and sulfides.

8. The enamel barrier layer according to claim 7, wherein said sulfide is zinc sulfide.

9. The enamel barrier layer according to claim 7, further comprising coloring metal oxides.

10. The enamel barrier layer according to claim 7, wherein said sulfide is at least one member of the group consisting of sulfides of alkali metals, alkaline earth metals, Mn, Fe, Co, Ni, Cu, Cd, Sn, Sb, and Bi.

11. A method of preventing silver migration into glass comprising placing an enamel barrier layer formed from glass frit and optionally one or more colorants and/or opacifiers between sheet glass and a resistive layer containing silver and firing at a temperature of from 450° C. to 800° C., wherein said glass frit is essentially free of lead for forming an enamel capable of preventing Ag+ migration, said glass frit comprising 15 to 70% by weight zinc oxide, 15 to 40% by weight silicon dioxide and 5 to 25 % by weight boron trioxide and containing dissolved in said glass 0.05 to 15 mol % of at least one member of the group consisting of sulfur and sulfides.

12. The method according to claim 11, wherein said temperature is from 550° C. to 750° C.

13. A composite glass product comprising sheet glass, enamel barrier layer, and silver resistive layer made by a method comprising placing an enamel barrier layer formed from a glass frit and optionally one or more colorants and/or opacifiers between sheet glass and a resistive layer containing silver and firing at a temperature of from 450° C. to 800° C., wherein said glass frit is essentially free of lead for forming an enamel capable of preventing Ag+ migration said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulfur and sulfides.

14. A composite glass article comprising a glass support layer, an enamel barrier layer deposited on said glass support layer, and a silver resistive layer deposited on said barrier layer, said enamel barrier layer being formed from a glass frit and optionally one or more colorants and/or opacifiers, wherein said glass frit is essentially free of lead for forming an enamel capable of preventing Ag+ migration, said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulfur and sulfides.

15. The composite glass article according to claim 14 which is glass for an automobile.

16. A process for the production of a glass frit essentially free of lead for forming an enamel capable of preventing Ag+ migration, said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulfur and sulfides, said process comprises melting a mixture comprising (a) glass forming oxide compounds, or non-oxide compounds which form glass forming oxides, corresponding to 15 to 70% by weight zinc oxide, 15 to 40% by weight silicon dioxide and 5 to 25% by weight boron trioxide and (b) 0.05 to 15 mol % of at least one member of the group consisting of sulfur and sulfides, at a temperature of 1,000° to 1,300° C. to dissolve said sulfur or said sulfides in said glass, cooling suddenly to form granules, and grinding said granules to form a frit.

17. A glass frit essentially free of lead for forming an enamel capable of preventing Ag+ migration, said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulfur and sulfides; said glass frit being produced by a process comprising melting a mixture comprising (a) glass forming oxide compounds, or non-oxide compounds which form glass forming oxides, corresponding to 15 to 70% by weight zinc oxide, 15 to 40% by weight silicon dioxide and 5 to 25% by weight boron trioxide and (b) 0.05 to 15 mol % of at least one member of the group consisting of sulfur and sulfides, at a temperature of 1,000° to 1,300° C. to dissolve said sulfur or said sulfides in said glass, cooling suddenly to form granules, and grinding said granules to form a frit.

* * * * *